US007403211B2

(12) United States Patent
Sheasby et al.

(10) Patent No.: US 7,403,211 B2
(45) Date of Patent: Jul. 22, 2008

(54) METHOD AND SYSTEM FOR INTERACTIVE REGION SEGMENTATION

(75) Inventors: Michael Chilton Sheasby, Boucherville (CA); A. Michael Mondry, Nun's Island (CA)

(73) Assignee: LumaPix, Inc., Quebec (CA)

( * ) Notice: Subject to any disclaimer, the term of this patent is extended or adjusted under 35 U.S.C. 154(b) by 533 days.

(21) Appl. No.: 10/761,271

(22) Filed: Jan. 22, 2004

(65) Prior Publication Data

US 2004/0160462 A1 Aug. 19, 2004

Related U.S. Application Data

(60) Provisional application No. 60/446,751, filed on Feb. 13, 2003.

(51) Int. Cl.
*G09G 5/00* (2006.01)
(52) U.S. Cl. .................... 345/661; 345/660; 345/662; 345/663; 345/664; 345/665
(58) Field of Classification Search ............... None
See application file for complete search history.

(56) References Cited

U.S. PATENT DOCUMENTS 5,371,847 A * 12/1994 Hargrove ............... 715/788
5,903,229 A * 5/1999 Kishi ..................... 341/20
6,310,631 B1 * 10/2001 Cecco et al. ............ 715/792
6,874,128 B1 * 3/2005 Moore et al. ............ 715/792
2004/0030997 A1 * 2/2004 Farrah .................... 715/530

\* cited by examiner

*Primary Examiner*—Mark Zimmerman
*Assistant Examiner*—Jwalant Amin
(74) *Attorney, Agent, or Firm*—Fish & Richardson P.C.

(57) ABSTRACT

A method and computer graphics program executed by a processor for interactively subdividing a region in a computer controlled graphics display system is described. The user directly manipulates a control object (or "handle") using a pointing device such as a computer mouse with the result that the region exposing the control object is evenly divided into an array or volume of smaller regions. The distance from the position of the start of interaction with the control object (the "click") is continuously monitored to interactively update the number of divisions in the horizontal and vertical directions. Example displays during this interaction phase include overlaid grids representing the actual position of pending subdivisions, or a matrix of abstract subregions representing the count of subregions that will be created when the user indicates that the interaction is complete by releasing the control object. Upon release of the control object, the previewed splits to the region are converted to real splits in the region.

24 Claims, 15 Drawing Sheets

GRID OVERLAYS

Step 0: the user brings the cursor 40 over the split handle 33 for a region 21

Step 1: the user presses the left mouse button

Step 2: the user drags the mouse to the right while holding the button down, producing temporary split indications 41

Step 3: the user continues to drag the mouse to the right

Step 4: the user continues to drag the mouse, changing direction and moving down:

Step 5: the user releases the mouse button. The region 21 is split into new regions 21a, 21b, 21c, 21d, 21e, 21f

FIGURE 1: COMPUTER SYSTEM
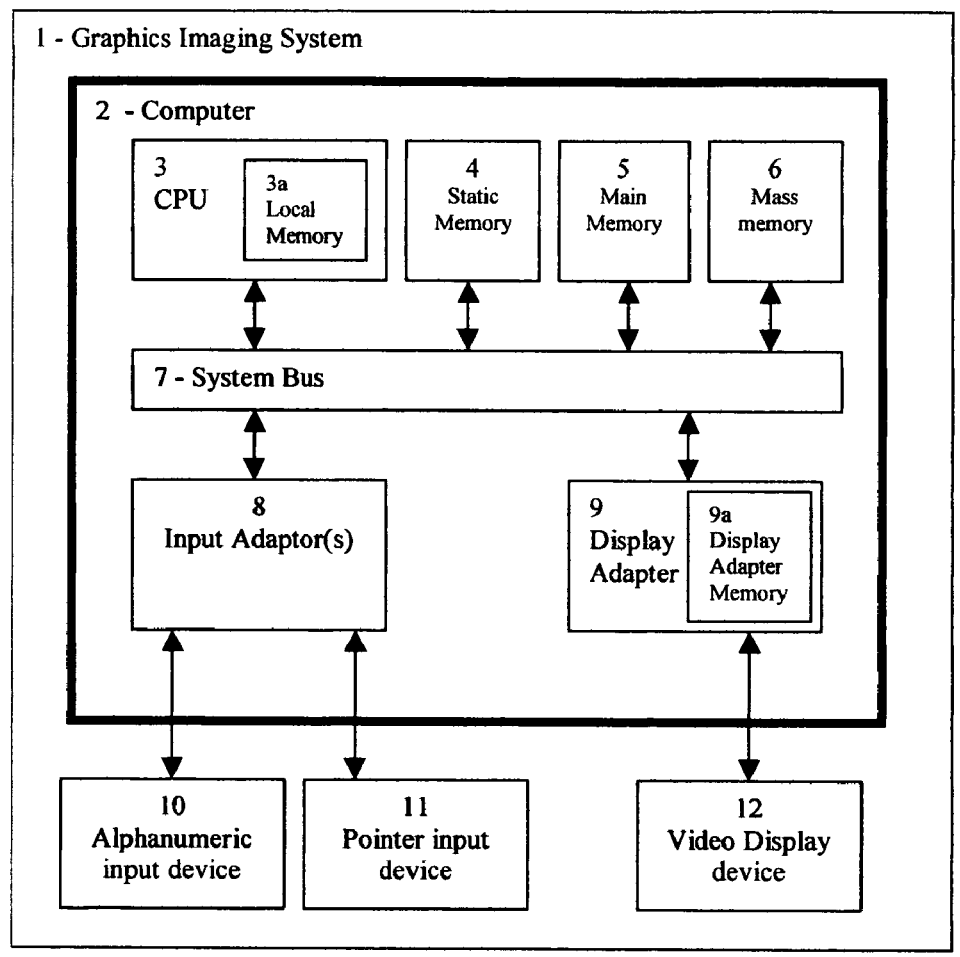

FIGURE 2: ABSTRACT COLLAGE
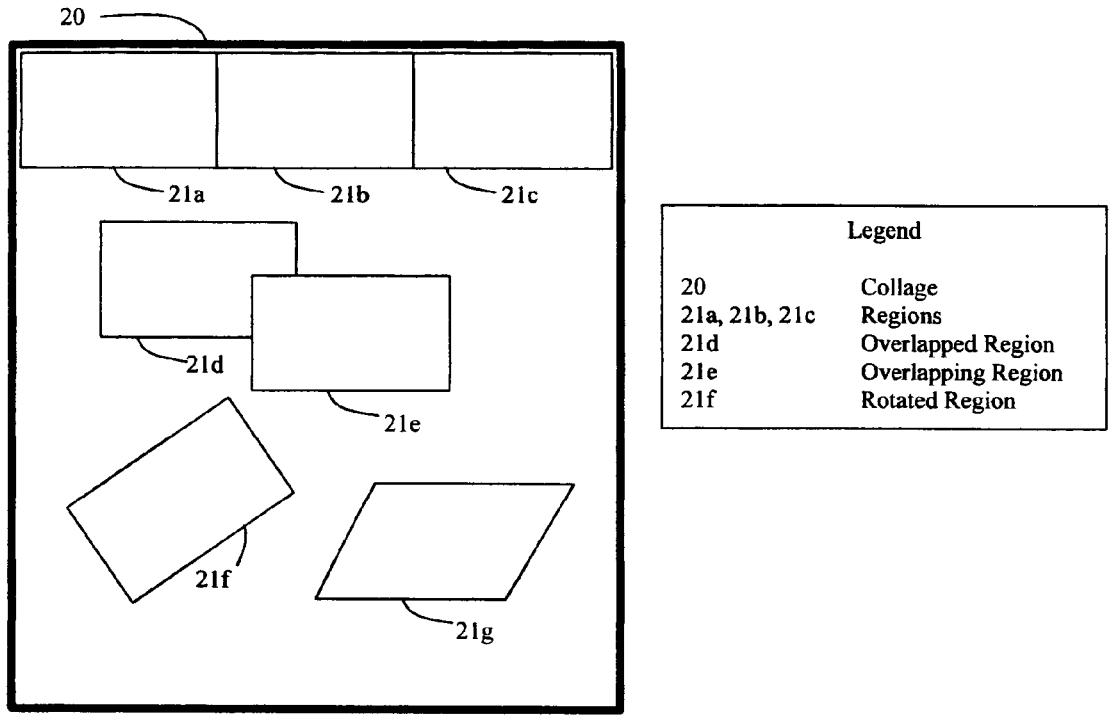
FIGURE 3: SIMPLE TILED COLLAGE
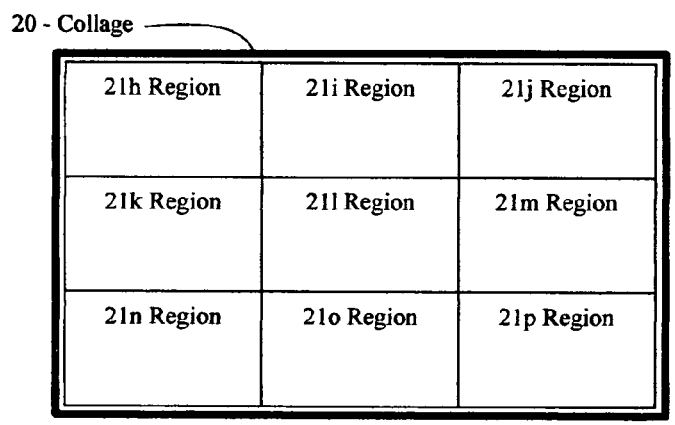

FIGURE 4: NON-GRID COLLAGE
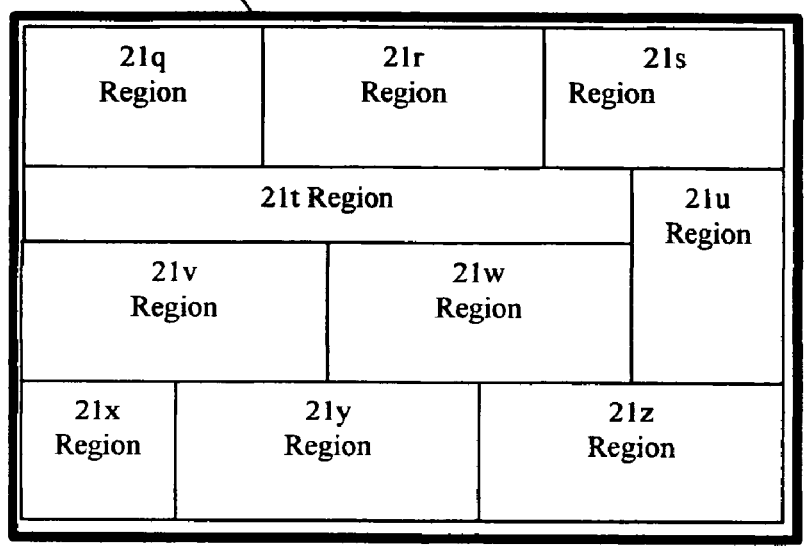

FIGURE 5: REGIONS
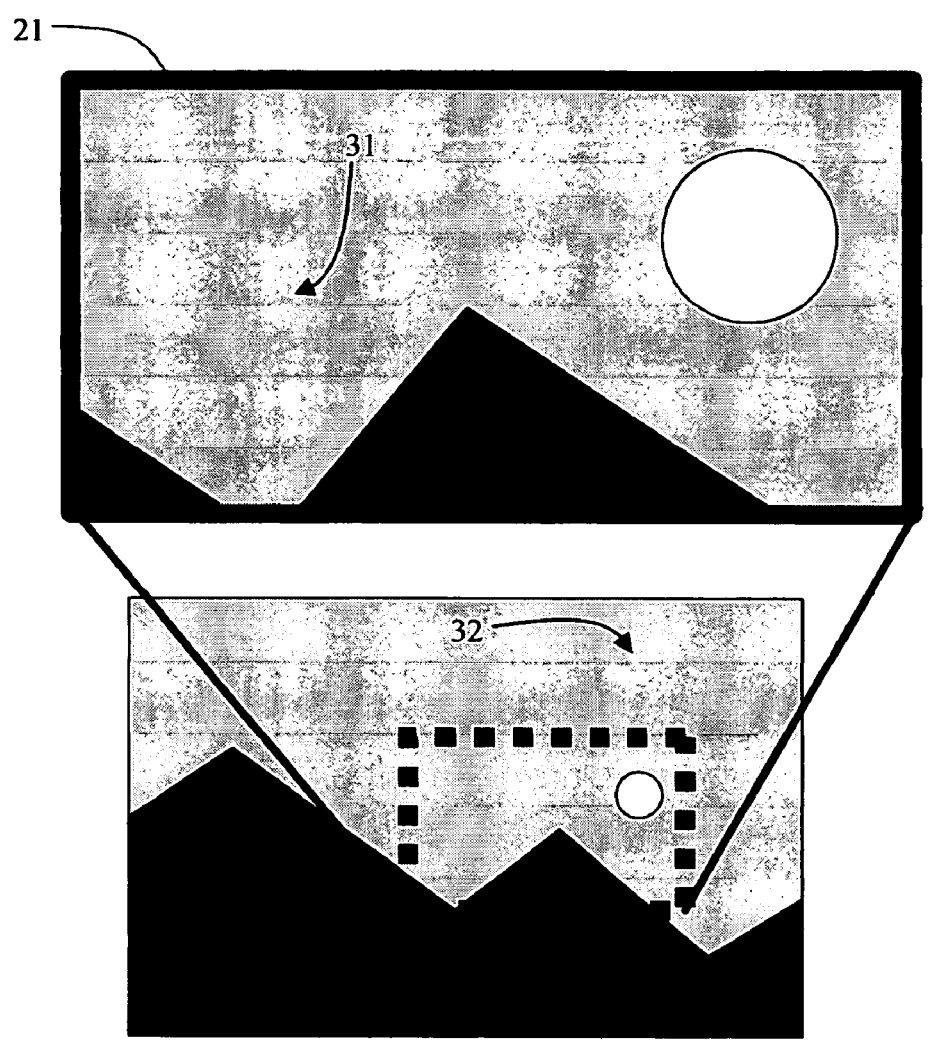

FIGURE 6: MANIPULATORS
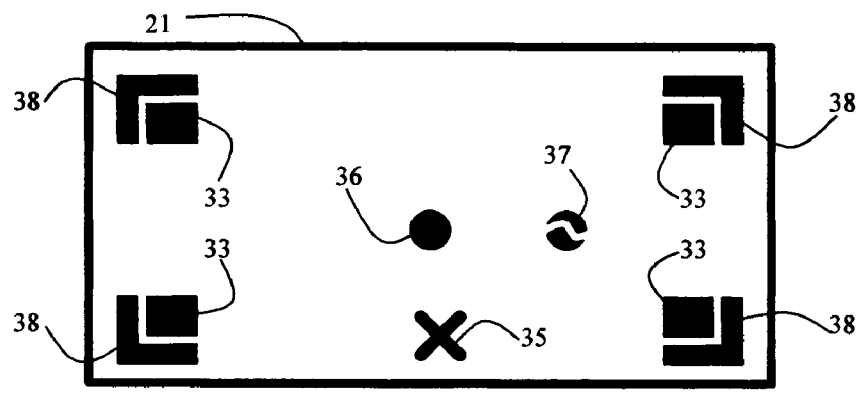
| | Legend |
|---|---|
| 21 | Region |
| 33 | Crop Handle |
| 35 | Delete Handle |
| 36 | Pan Handle |
| 37 | Rotate Handle |
| 38 | Resize Handle |

FIGURE 7: REGION ROTATION
Step 0: the user brings the cursor 40 over the rotate handle 37 in the region 21
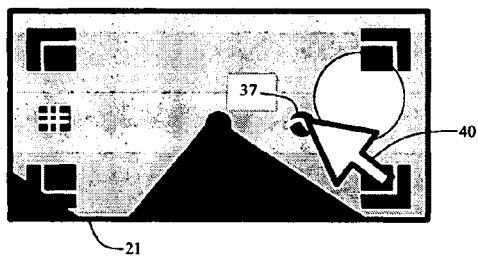
Step 1: the user presses the left mouse button
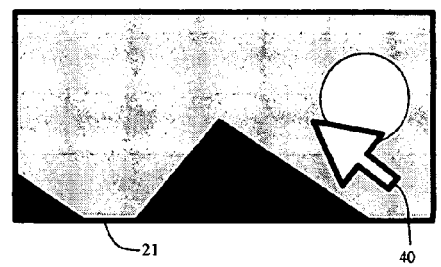
Step 2: the user drags the mouse while holding the button down
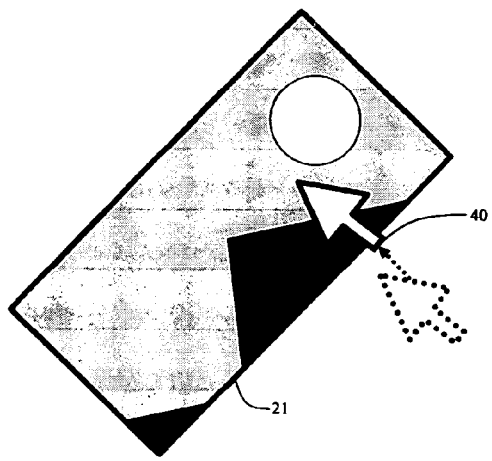
Step 3: the user releases the mouse button
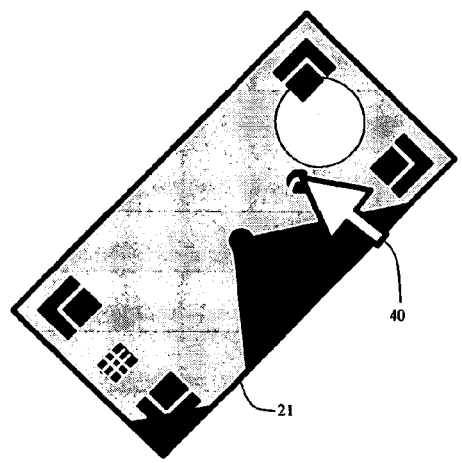

FIGURE 8: REGION RESIZING
Step 0: the user brings the cursor 40 over a resize handle 32 on a region 21
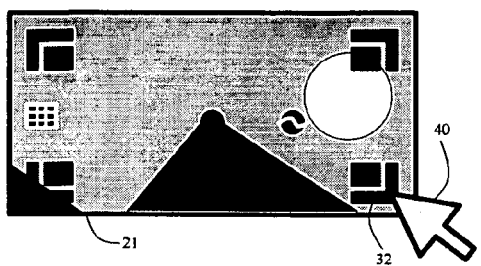
Step 1: the user presses the left mouse button
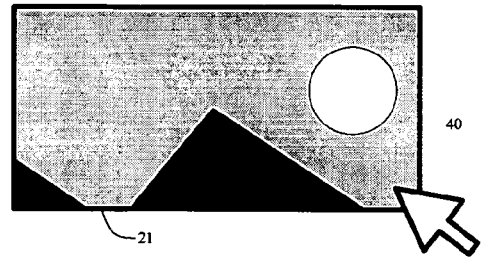
Step 2: the user drags the mouse while holding the button down
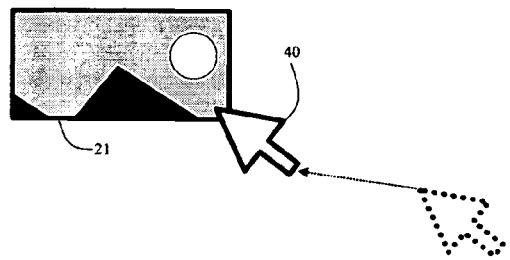
Step 3: the user releases the mouse button
[The handles may be drawn at reduced size if necessary]
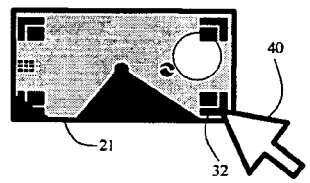

FIGURE 9: IMAGE PANNING
Step 0: the user brings the cursor 40 over the pan handle 36 for the region 21
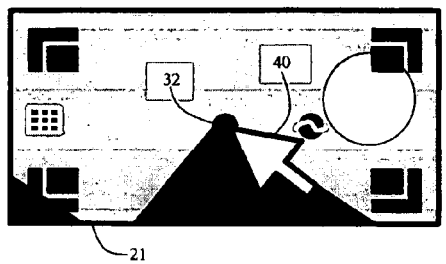
Step 1: the user presses the left mouse button
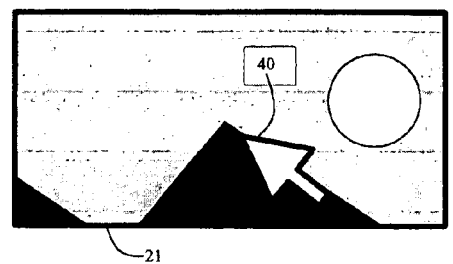
Step 2: the user drags the mouse while holding the button down
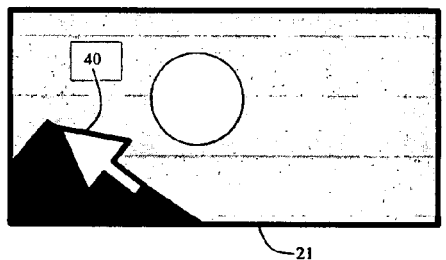
Step 3: the user releases the mouse button
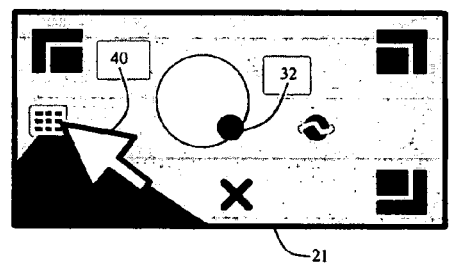

FIGURE 10: IMAGE CROPPING
Step 0: the user brings the cursor 40 over a crop handle 33 in the region 21
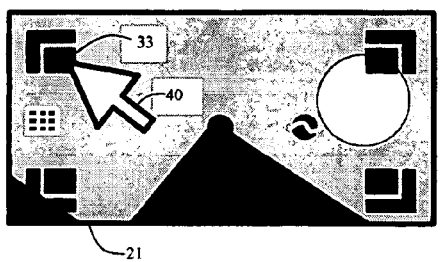
Step 1: the user presses the left mouse button
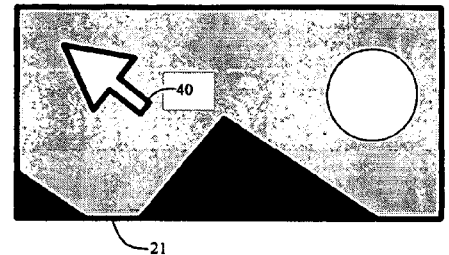
Step 2: the user drags the mouse while holding the button down
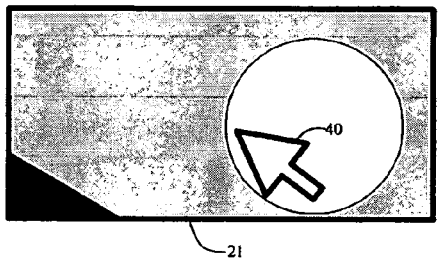
Step 3: the user releases the mouse button
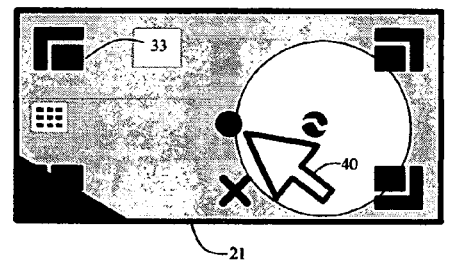

FIGURE 11: DELETING REGIONS
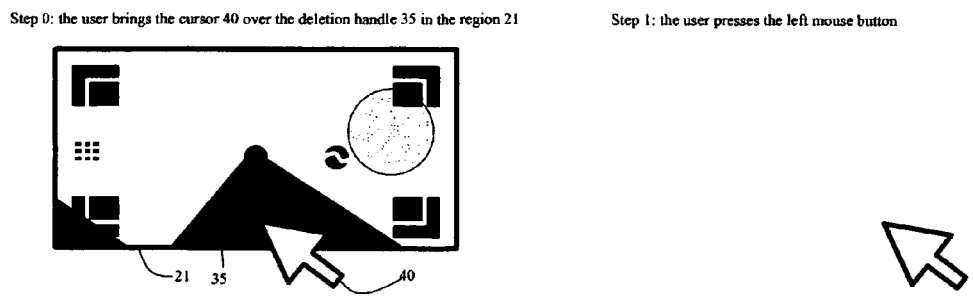

FIGURE 12: SIMPLE SEGMENTATION
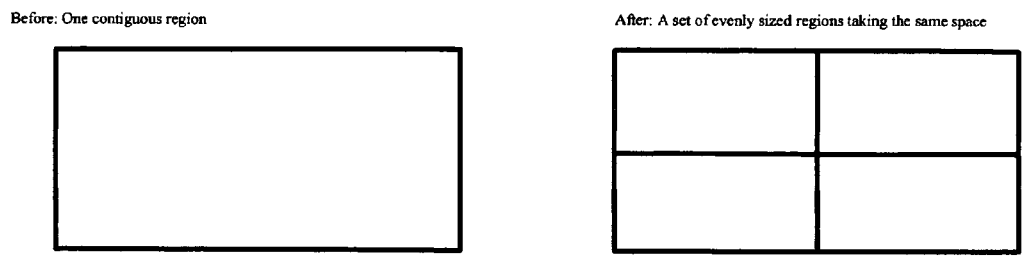
FIGURE 13: SEQUENTIAL SEGMENTATION
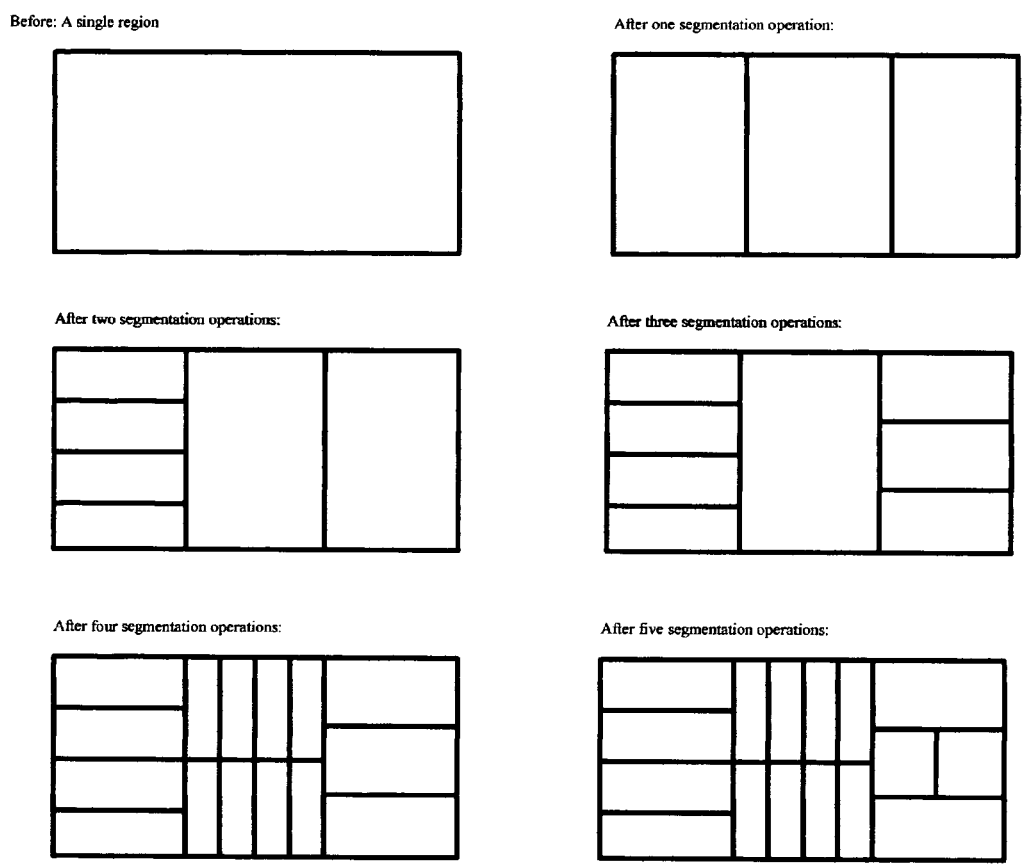

FIGURE 14: IMAGE SEGMENTATION USING A MOUSE

Step 0: the user brings the cursor 40 over the split handle 33 in the region 21 (other handles not drawn for clarity)

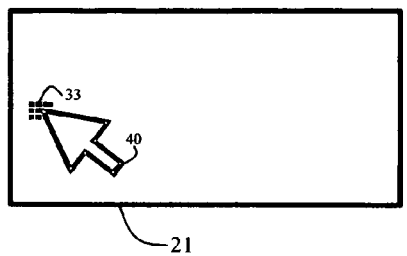

Step 1: the user presses the left mouse button

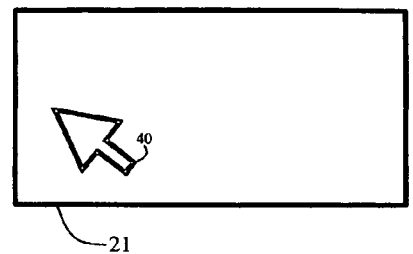

Step 2: the user drags the mouse while holding the button down. Temporary split indications 41 are overlaid over the region 21

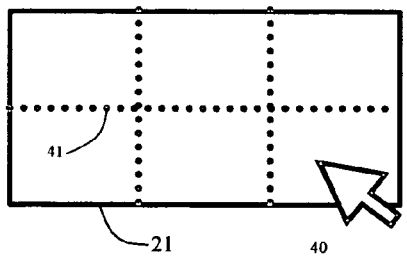

Step 3: the user releases the mouse button, producing a set of regions 21a, 21b, 21c, 21d, 21e, 21f

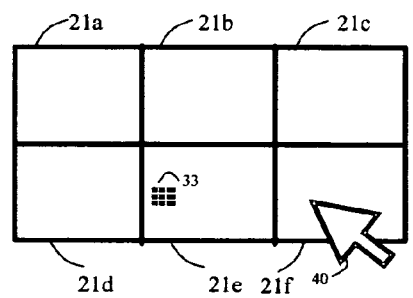

FIGURE 15: GRID OVERLAYS

Step 0: the user brings the cursor 40 over the split handle 33 for a region 21

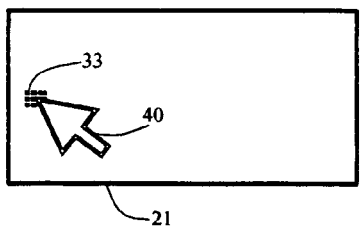

Step 1: the user presses the left mouse button

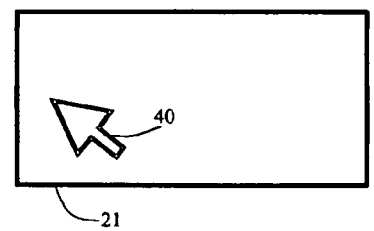

Step 2: the user drags the mouse to the right while holding the button down, producing temporary split indications 41

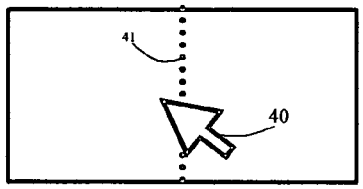

Step 3: the user continues to drag the mouse to the right

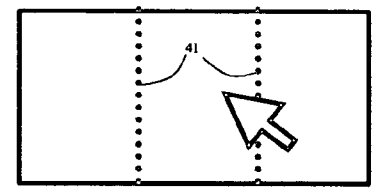

Step 4: the user continues to drag the mouse, changing direction and moving down:

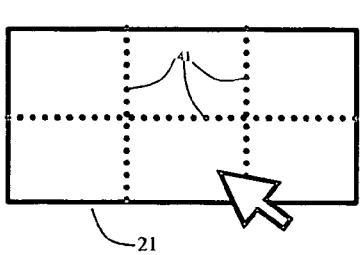

Step 5: the user releases the mouse button. The region 21 is split into new regions 21a, 21b, 21c, 21d, 21e, 21f.

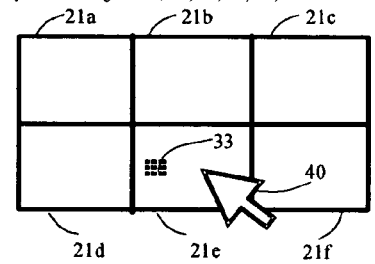

FIGURE 16: SPLITTING OVERLAPPING REGIONS
In the case of overlapping regions:
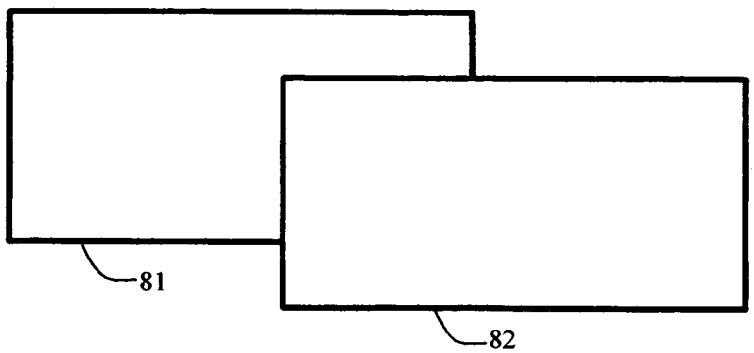
... split lines may appear occluded by the overlapping region:
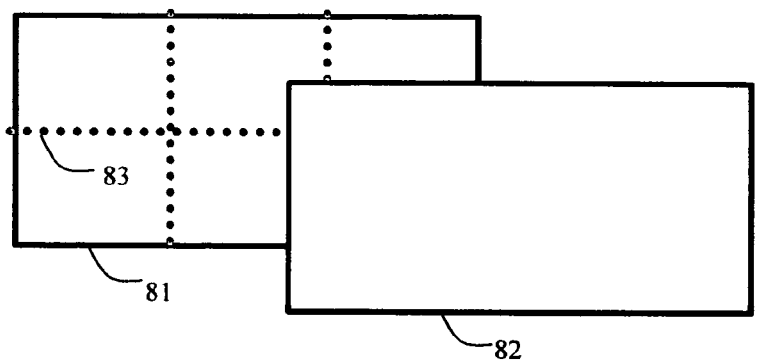
... or they may appear atop all other objects in the display:
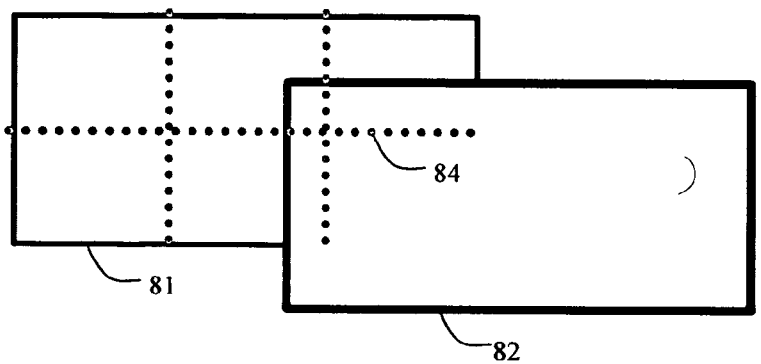
| Legend | |
|---|---|
| 81 | Occluded region |
| 82 | Occluding region |
| 83 | Underlaid crop lines |
| 34 | Overlaid crop lines |

FIGURE 17: IMAGE SEGMENTATION WITH CELL OVERLAY
Step 0: the user brings the cursor 40 over the split handle 33 in the region 21
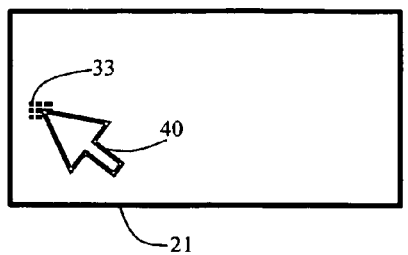
Step 1: the user presses the left mouse button
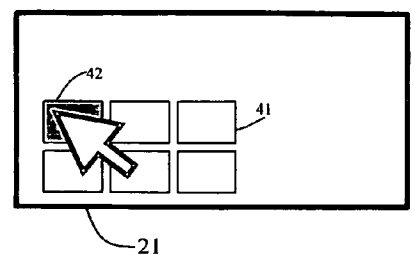
Step 2: the user drags the mouse while holding the button down
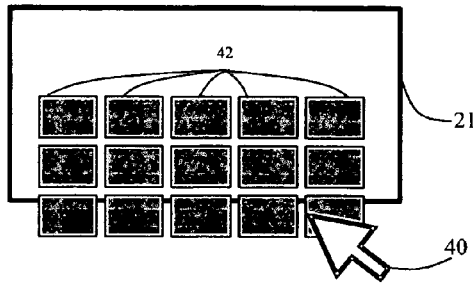
Step 3: the user releases the mouse button
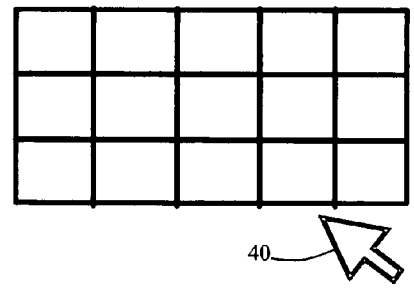
| Legend | |
|---|---|
| 21 | Region |
| 33 | Split Handle |
| 40 | Cursor |
| 41 | Temporary Cell Overlay |
| 42 | Highlighted Cell |

METHOD AND SYSTEM FOR INTERACTIVE REGION SEGMENTATION

CROSS-REFERENCE TO RELATED APPLICATIONS

The present invention shares the same inventors and assignee as, and is related to, the following applications:

Ser. No. 10/761,315, entitled "METHOD AND SYSTEM FOR INTERACTIVE CROPPING OF A GRAPHICAL OBJECT WITHIN A CONTAINING REGION", as well as Ser. No. 10/761,314, entitled "METHOD AND SYSTEM FOR DISTRIBUTING MULTIPLE DRAGGED OBJECTS", in that the methods of object cropping and object distribution described therein may optionally be combined with the user interface elements described herein.

The present application formalizes the provisional utility patent application with application Ser. No. 60/446,751 and confirmation number 4660, filed Feb. 13, 2003.

FIELD OF THE INVENTION

The present invention relates particularly to a graphics imaging system for producing visual designs and more particularly to a graphics imaging system that presents a display of a plurality of regions arranged into a regular structure, for example to form a collage of bitmapped images.

BACKGROUND OF THE INVENTION

Computer systems are sometimes used to process digital imagery, such as that captured by digital cameras and scanners, into new forms. The processing may include assembling several images into new images, such as mosaics or collages. The present invention includes a method for streamlining the segmentation of a region or volume into smaller regions or volumes. While the examples provided refer to the assembly of collages from multiple source images, the technique is applicable to any task involving the arrangement of multiple two- or three-dimensional regions.

SUMMARY OF THE INVENTION

The present invention provides for an interaction technique, implementable on a computer readable medium, for interactively segmenting a region into an array of smaller regions. We use the term 'region' to indicate a two- or three-dimensional bounded area on a computer display which can be used, without lack of generality, to contain a bitmapped raster image.

In one aspect of the invention, the user enters a segmenting mode, interactively segments a particular region into a plurality of smaller regions which in aggregate retain the overall dimensions of the initial region, and then leaves the segmenting mode.

In another aspect of the invention, the segmentation is performed by direct manipulation of a control drawn on the border of said initial region with a user interface device such as a mouse or keyboard.

In another aspect of the invention, the segmentation is computed using the updated position of a pointing device such as a mouse relative to the position at the start of interaction. A keyboard may also be used. The segmentation forms a combination of rows and/or columns of evenly-spaced regions which fill the initial region when the user exits the segmentation mode.

In another aspect of the invention, the user receives visual feedback during segmentation which indicates the number and position of subregions which will be created when the segmentation mode is exited. This feedback may take the form of lines on the original region at the actual location where new regions will be created, or it may take the form of an overlaid grid of cells indicating the number of new regions that will be formed.

In another aspect of the invention, the original region may either be replaced by the collection of new regions at the end of interaction, or it may continue to exist as a container of the new regions in a parent-child relationship.

BRIEF DESCRIPTION OF THE DRAWINGS

A specific embodiment of the invention will now be described, by way of example, with reference to the accompanying drawings in which:

FIG. 1 depicts a computer system suitable for implementing a system for segmenting regions, according to the present invention.

FIG. 2 depicts an abstract collage, demonstrating various operations that can be applied to the regions it contains.

FIG. 3 depicts a simple, grid-based tiled collage.

FIG. 4 depicts a non-grid collage.

FIG. 5 depicts the relationship between regions and bitmapped source images they may contain FIG. 6 depicts an example set of manipulators that decorate the frame of a region in the preferred embodiment of the invention.

FIG. 7 depicts region rotation using a manipulator handle.

FIG. 8 depicts region resizing using a manipulator handle.

FIG. 9 depicts image panning using a manipulator handle.

FIG. 10 depicts image cropping using a manipulator handle.

FIG. 11 depicts region deletion using a manipulator handle.

FIG. 12 depicts a simple one-step region segmentation.

FIG. 13 depicts the creation of a complex collage creation using a sequence of region segmentations.

FIG. 14 depicts the steps of region segmentation in the preferred mouse-based implementation of the invention.

FIG. 15 draws attention to the visual references drawn over the region during mouse-based segmentation.

FIG. 16 depicts alternatives to said visual references drawn on overlapped regions.

FIG. 17 depicts an alternative embodiment of the visual references drawn during mouse-based segmentation.

DETAILED DESCRIPTION

In the following discussion, the present invention is described for illustrative purposes with reference to the editing of raster image information. However, one of ordinary skill in the art will recognize that the invention, in its broadest aspect, is applicable to processes other than image manipulation, and it is not intended that the scope of the invention be so limited. For example, the present invention is also applicable to the editing of video data, and to media data in general.

Computer Imaging System

A computer graphics imaging system 1 is schematically depicted in FIG. 1. The graphics imaging system 1 includes a computer 2 that has a central processing unit (CPU) 3 which may include local memory 3a, static memory 4 such as Read-only memory (ROM), main memory 5 such as Random Access memory (RAM), mass memory 6 such as a computer disk drive, a system bus 7, adaptor(s) for external input devices 8, and a display adapter 9 which may include local memory 9a. The computer 2 communicates with an alphanumeric input device 10 such as a keyboard, a pointer device 11 such as a mouse for manipulating a cursor and making selections of data via said input adapter 8. The computer 2 communicates with a video display 12 such as a computer monitor via said display adapter 9.

The computer 2 executes imaging software described below to allow the system 1 to render high quality graphics images on the monitor 12. The CPU 3 comprises a suitable processing device such as a microprocessor, for example, and may comprise a plurality of suitable processing devices. The graphics adaptor 9 may also be capable of executing instructions. Instructions are stored in the CPU local memory 3a, static memory 4, display adapter local memory 9a, main memory 5, and/or mass memory 6 and are executed by the CPU 3 or the display adapter 9.

The static memory 4 may comprise read only memory (ROM) or any other suitable memory device. The local memory may store, for example, a boot program for execution by CPU 3 to initialize the graphics imaging system 1. The main memory 5 may comprise random access memory (RAM) or any other suitable memory device. The mass memory 6 may include a hard disk device, a floppy disk, an optical disk, a flash memory device, a CDROM, a file server device or any other suitable memory device. For this detailed description, the term memory comprises a single memory device and any combination of suitable devices for the storage of data and instructions.

The system bus 7 provides for the transfer of digital information between the hardware devices of the graphics imaging system 1. The CPU 3 also receives data over the system bus 7 that is input by a user through alphanumeric input device 10 and/or the pointer device 11 via an input adaptor 8. The alphanumeric input device 10 may comprise a keyboard, for example, that comprises alphanumeric keys. The alphanumeric input device 10 may comprise other suitable keys such as function keys for example. The pointer device 11 may comprise a mouse, track-ball, tablet and/or joystick, for example, for controlling the movement of a cursor displayed on the computer display 12.

The graphics imaging system 1 of FIG. 1 also includes display adapter hardware 9 that may be implemented as a circuit that interfaces with system bus 7 for facilitating rendering of images on the computer display 12. The display adapter hardware 9 may, for example, be implemented with a special graphics processor printed circuit board including dedicated random access memory 9a that helps speed the rendering of high resolution, color images on a viewing screen of the display 12.

The display 12 may comprise a cathode ray tube (CRT) or a liquid crystal display particularly suited for displaying graphics on its viewing screen. The invention can be implemented using high-speed graphics workstations as well as personal computers having one or more high-speed processors.

The graphics imaging system 1 utilizes specialized graphics software particularly suited to take advantage of the imaging hardware included in the display system 1 depicted in FIG. 1. The software implements a user interface and related processing algorithms as described in subsequent sections to enable the user to produce graphical works viewed on the display 12 and which may be stored in mass memory 6. The graphical works may involve the assembly of graphical objects such as bitmaps. Source material for use with such a system can include previously digitized materials stored on a computer memory 6 such as images from digital cameras, scanning devices, or the internet, stored on a large capacity hard or fixed disk storage device.

Collages

For the purposes of this invention a Collage is defined as an arrangement of two-dimensional graphical objects, such as digital images, into a larger graphical object. As shown in FIG. 2, the regions 21a-g within the collage 20 may tile (21a, 21b, 21c), overlap (21d, 21e), be rotated to any angle (21f), skewed (21g), or otherwise affected by the user.

Collages which fit neatly together, with even spaces between adjacent images, are visually pleasing. As shown in FIG. 3, regular grids, such as 2×2 or 3×4 arrangements of four or twelve images respectively, are often used to assemble a composite image from several source images.

Users who wish collages of more visual complexity may choose to arrange the tiled images into non-grid patterns. As shown in FIG. 4, these collages may form a 'brick wall' interleaving or other more sophisticated arrangements.

The current invention provides the user with tools for quickly constructing both regular grid and non-grid collages.

Regions

The collage is composed of a set of user-manipulable frames that define regions within the collage. As shown in FIG. 5, each region 21 frames and contains exactly one graphical object 31, such as a bitmapped image, which can be panned and zoomed within the frame. The graphical object is a reference to a source object 32, such as a bitmap.

As shown in FIG. 6, the user can apply several types of manipulation to a frame by manipulating controls (33-38) which in the preferred embodiment of the invention are built into the frame of each region. These controls can be driven via a user interface device such as a mouse, or using a keyboard. The operations include:

Rotating the region 21 (see FIG. 7)
Resizing the region 21 (see FIG. 8)
Panning the image 31 contained within the region 21 (see FIG. 9)
Cropping the image 31 contained within the region 21 (see FIG. 10)
Deleting the region 21 (see FIG. 11)
Segmenting the region 21 (described below).

Region Segmentation

The present invention specifically relates to the segmentation, or splitting, of regions: the production of a set of smaller regions which in aggregate retain the overall dimensions of the initial region.

Segmentation is a useful tool for building collages: simple grid-based collage layouts can be constructed in a single operation (FIG. 12) while complex, irregular collages can be constructed by applying sequential segmentation operations (FIG. 13)

Referring again to FIG. 6, there is shown, in graphical form, a region 21. In one embodiment of this invention, said region is decorated with interactive manipulator handles 33-38 enabling the user to apply various operations on the region and the image it contains via a pointing user interface device. In particular there exists a handle 33 which enables segmentation of said region 21. Said handle may appear anywhere in or about said region 21.

Segmenting Regions Using a Mouse Input Device

In one embodiment of this invention, the user segments the region by manipulating an input device such as a mouse as illustrated in FIG. 14:

1. Moving the mouse such that the pointer 40 is positioned over the split handle 33

The handle 33 may assume a new visual state, such as a brightened or highlighted representation, to indicate that it will become active if the user presses the mouse button.

2. Pressing the mouse button

The handle 33 and other decoration on the frame may disappear to allow the user to concentrate on the image itself.

3. Dragging the mouse down and to the right

As the user drags, the display may update to reflect the segmentation the user is currently specifying. For example, it may superimpose lines 41 on the region indicating the number of splits that will occur.

The Algorithm for calculating the number of splits and alternative visual representations are discussed below.

4. Releasing the mouse button

The region will be segmented if it has not already done so

The handle 33 and all other decoration on the frame may reappear if they were hidden in step 2.

The handles may be drawn smaller if necessary to fit within the new regions

In step 3 above, the number of rows and columns that the region(s) will be segmented into is calculated by determining the distance from the current pointer position to the position at the time of the button press in step 2. This distance is composed of an X and a Y coordinate: the segmentation is computed as follows:

```
void CPicInfoManager::SplitFrame(CPicInfo* in_ppi, LONG in_xCells,
LONG in_yCells)
{
ASSERT(in_ppi);
   // Set the rotated box based on the rotation of the frame
   RectF rcBox(in_ppi->GetFrameBox( ));
   REAL fAngle = in_ppi->GetRotation( );
   Matrix m;
   m.Translate(rcBox.X, rcBox.Y);
   m.RotateAt(fAngle, PointF((rcBox.Width / 2), (rcBox.Height / 2)));
   // Determine the final cell size
   rcBox.Width /= in_xCells;
   rcBox.Height /= in_yCells;
   CPicInfo* ppi = in_ppi;
   for (LONG y = 0; y < in_yCells; y++)
   {
      for (LONG x = 0; x < in_xCells; x++)
      {
         // If we're the upper left cell, then we're ourself
         if (x || y)
         {
            ppi = CreateFrame(RectF(0, 0, 0, 0));
         }
         // Resize and rotate the frame
         ppi->SetFrameSize(rcBox.Width, rcBox.Height);
         ppi->SetRotation(fAngle);
         // Rotate it within the final box
         PointF ptBox((x * rcBox.Width) + (rcBox.Width / 2),
               (y * rcBox.Height) + (rcBox.Height / 2));
         m.TransformPoints(&ptBox);
         // Set it's new rotated position and show the item
         ppi->SetFramePos(ptBox.X-(rcBox.width / 2),
ptBox.Y-(rcBox.Height / 2));
         ppi->Show(true);
      }
   }
}
```

Region Segmentation Mode

Once the mouse button was pressed while the cursor 40 was over the split handle 33 in step 2 of the previous section, and until the mouse button was released in the subsequent step 4, the graphics system was in "Region Segmentation Mode".

In another embodiment of this invention, the user has other means for entering and leaving this mode for a given selected region(s), such as via the use of a keyboard:

1. Pressing and releasing a key (such as 's') to enter Region Segmentation Mode (applying the segmentation using any technique described here)

2. Subsequently pressing a key (such as 'enter', or 's' again) to exit the mode or 1. Pressing and holding a key (such as 's') to enter Region Segmentation Mode (applying the segmentation using any technique described here)

2. Subsequently releasing said key to exit the mode

Segmenting Regions Using a Keyboard Input Device

In another embodiment of this invention, the user segments a selected region using a keyboard, as follows:

1. Entering the Region Segmentation Mode (For example, by pressing and releasing the 's' key)

and then . . .

2a). Pressing and releasing a key which increases horizontal segmentation (such as the right arrow key)

A column will be added to the previewed horizontal segmentation of the region or 2b). Pressing and releasing a key which decreases horizontal segmentation (such as the left arrow key)

A column will be removed from the previewed horizontal segmentation of the region or 2c). Pressing and releasing a key which increases vertical segmentation (such as the down arrow key)

A row will be added to the previewed vertical segmentation of the region or

2d). Pressing and releasing a key which decreases vertical segmentation (such as the up arrow key)

A row will be removed from the previewed vertical segmentation of the region

Aborting Segmentation

In another embodiment of this invention, the user is able to abort the segmentation operation while in Region Segmentation Mode. This is accomplished by pressing a key, such as the 'esc' key. This removes any previewed segmentation, refreshes the display to include the handles decorating the regions again if necessary, and exits Region Segmentation Mode.

Visual Feedback During Segmentation

In another embodiment of this invention, the user is provided with visual feedback as the segmentation operation progresses under his control.

Grid Lines

In the preferred embodiment of the invention, and as illustrated in FIG. 14, feedback regarding the progress of the segmentation is provided to the user while in Region Subdivision Mode by means of a set of lines 41 drawn over the region(s) undergoing segmentation. The position of the lines indicates the actual location of row and/or column divisions that will result when Region Segmentation Mode is exited.

As the user increases or decreases the amount of segmentation, these lines are updated to reflect the new position of the splits (FIG. 14).

These lines are drawn on top of the region(s) being subdivided; without loss of generality they may be drawn above or below other regions which happen to overlap said region(s) (FIG. 15).

When Region Segmentation Mode is exited, the lines are removed. The new arrangement of regions resulting from the segmentation will exactly align with the final position of said lines.

Cells

In another embodiment of the invention as illustrated in FIG. 17, feedback regarding the progress of the segmentation is provided to the user while in Region Subdivision Mode by means of a grid of cells 41 drawn over the display, positioned at the location where interaction began.

As the user increases or decreases the amount of segmentation, the cells in the grid are highlighted 42 to reflect the number of rows and columns that will result from the segmentation.

The grid may have a minimum dimension (say, 3 by 3 cells). In the event that the user selects a segmentation of greater than this minimum dimension, the grid will be extended in the appropriate direction to completely contain the number of cells required to continue to reflect the desired segmentation.

This grid of cells 41 is drawn on top of all regions on the display.

When Region Segmentation Mode is exited, the grid is removed. The new arrangement of regions resulting from the segmentation will reflect the number of cells there were highlighted during the region segmentation operation.

Completing Segmentation

When the user exits Region Segmentation Mode without aborting, a set of new regions are added to the display such that their aggregate dimensions match the dimensions of the original region.

In the preferred embodiment of the invention, the original region is replaced by the new regions which are independent and can be further manipulated or split by the user without affecting other regions.

In another embodiment of the invention, the original region is retained and the new regions are considered as subregions of the original region in a parent-child relationship.

In either case it is possible to retain the contents of the original frame, if any, within one of the newly-created regions.

MODIFICATIONS AND ALTERNATE EMBODIMENTS

Having described the invention, it should be apparent to those of ordinary skill in the art that the foregoing is illustrative and not limiting. Numerous modifications, variations and alterations may be made to the described embodiments without departing from the scope of the invention by one of ordinary skill in the art and are contemplated as falling within the scope of the invention as defined by the appended claims.

We claim:

1. A method for segmenting an initial region on a display into a set of at least two newly-created independent regions using an input device, the initial region comprising a bounded area or volume of the display, the display including one or more regions within a larger area or volume, the set of newly-created independent regions arranged into a matrix of equally-sized regions, wherein the equally-sized regions in aggregate equal the dimensions of the initial region, the input device being adapted to convert a user input into a two or three-dimensional position, the method comprising:

entering an interactive segmenting mode; then detecting the initial position of the input device at the time of entering the interactive segmenting mode;

continually performing the following steps until the interactive segmenting mode remains:

monitoring ongoing movements of the input device, computing a number of equidistant horizontal and vertical splits to apply to the initial region as a function of the distance of the input device to the initial position, wherein segmentation of the region is computed by equally sectioning the region into rows and/or columns by dividing in both x and v directions the distance from the current pointer position to the position of the pointer as it was when the user entered the segmenting mode with a constant scaling factor applied to the distance and using the result to determine the number of equal sized horizontal and vertical splits; and indicating positions of the pending splits to a user;

leaving the interactive segmenting mode;

replacing the initial region with the set of newly-created independent regions at the positions previously indicated to the user.

2. The method of claim 1 wherein the display further associates a visual control with each region which enables interactive splitting mode, said control to be rendered visible either upon selection of the region, upon entry into the region by a pointing device, or at all times.

3. The method of claim 1 wherein the step of entering and leaving the interactive segmenting mode comprises pressing a button on a computer mouse over a visual control associated with one of the selected regions and subsequently releasing the button.

4. The method of claim 1 wherein the step of entering and leaving the interactive segmenting mode comprises pressing a key on the keyboard and subsequently releasing it.

5. The method of claim 1 wherein said distance is a function of the number of times the user has pressed keys on the keyboard indicating that horizontal or vertical segmentation should be increased or decreased.

6. The method of claim 1 wherein the segmentation is applied to the region when the segmenting mode is exited, and the user is further able to abort segmentation, the method for aborting comprising pressing a key.

7. The method of claim 1 wherein the user further receives interactive visual feedback via an overlaid set of lines on the region indicating the actual location of row and/or column divisions that result from his interaction with the input device.

8. The method of claim 1 wherein the user further receives interactive visual feedback via an overlaid grid display indicating the number of rows and/or columns that result from his interaction with the input device.

9. The method of claim 1 wherein the segmentation of the original region(s) replaces those region(s) with new, independent regions according to the segmentation selected by the user.

10. The method of claim 9 wherein the material contained within the original region(s) are retained within one of the newly-created regions.

11. The method of claim 1 wherein the segmentation of the original region(s) is stored as a collection of subregions of the original region, which continues to exist within the system.

12. The method of claim 1, wherein said independent regions are adapted to be manipulatable by the user via translation, scaling, rotation and cropping via user interface controls provided for that effect, wherein translation includes the ability to overlap peer frames.

13. A computer readable medium having computer instructions stored thereon for implementing a method for segmenting an initial region on a display into a set of at least two newly-created independent regions using an input device, the initial region comprising a bounded area or volume of the display, the display including one or more regions within a larger area or volume, the set of newly-created independent regions arranged into a matrix of equally-sized regions, wherein the equally-sized regions in aggregate equal the dimensions of the initial region, the input device being adapted to convert a user input into a two or three-dimensional position, the method comprising:

entering an interactive segmenting mode; then detecting the initial position of the input device at the time of entering the interactive segmenting mode;

continually performing the following steps until the interactive segmenting mode remains:

monitoring ongoing movements of the input device, computing a number of equidistant horizontal and vertical splits to apply to the initial region as a function of the distance of the input device to the initial position, wherein segmentation of the region is computed by equally sectioning the region into rows and/or columns by dividing in both x and y directions the distance from the current pointer position to the position of the pointer as it was when the user entered the segmenting mode with a constant scaling factor applied to the distance and using the result to determine the number of equal sized horizontal and vertical splits; and indicating to a user positions of the pending splits;

leaving the interactive segmenting mode, replacing the initial region with the set of newly-created independent regions at the positions previously indicated to the user.

14. The computer readable medium of claim 13 wherein the display further associates a visual control with each region which enables interactive splitting mode, said control to be rendered visible either upon selection of the region, upon entry into the region by a pointing device, or at all times.

15. The computer readable medium of claim 13 wherein the step of entering and leaving the interactive segmenting mode comprises pressing a button on a computer mouse over a visual control associated with one of the selected regions and subsequently releasing the button.

16. The computer readable medium of claim 13 wherein the step of entering and leaving the interactive segmenting mode comprises pressing a key on the keyboard and subsequently releasing it.

17. The computer readable medium of claim 13 wherein said distance is a function of the number of times the user has pressed keys on the keyboard indicating that horizontal or vertical segmentation should be increased or decreased.

18. The computer readable medium of claim 13 wherein the segmentation is applied to the region when the segmenting mode is exited, and the user is further able to abort segmentation, the method for aborting comprising pressing a key.

19. The computer readable medium of claim 13 wherein the user further receives interactive visual feedback via an overlaid set of lines on the region indicating the actual location of row and/or column divisions that result from his interaction with the input device.

20. The computer readable medium of claim 13 wherein the user further receives interactive visual feedback via an overlaid grid display indicating the number of rows and/or columns that result from his interaction with the input device.

21. The computer readable medium of claim 13 wherein the segmentation of the original region(s) replaces those region(s) with new, independent regions according to the seamentation selected by the user.

22. The computer readable medium of claim 21 wherein the material contained within the original region(s) are retained within one of the newly-created regions.

23. The computer readable medium of claim 13 wherein the segmentation of the original region(s) is stored as a collection of subregions of the original region, which continues to exist within the system.

24. The computer readable medium of claim 13, wherein said independent regions are adapted to be manipulatable by the user via translation, scaling, rotation and cropping via user interface controls provided for that effect, wherein translation includes the ability to overlap peer frames.

\* \* \* \* \*

UNITED STATES PATENT AND TRADEMARK OFFICE
CERTIFICATE OF CORRECTION

PATENT NO. : 7,403,211 B2
APPLICATION NO. : 10/761271
DATED : July 22, 2008
INVENTOR(S) : Michael Chilton Sheasby It is certified that error appears in the above-identified patent and that said Letters Patent is hereby corrected as shown below:

Column 8, Line 16
In Claim 1, delete "v" and insert -- y --

Column 10, Line 31
In Claim 21, delete "seamentation" and insert -- segmentation --

Signed and Sealed this

Fourth Day of November, 2008

JON W. DUDAS
*Director of the United States Patent and Trademark Office*